United States Patent [19]

Triffitt

[11] 4,252,033

[45] Feb. 24, 1981

[54] VARIABLE SPEED TRANSMISSION SYSTEMS

[75] Inventor: James Christopher H. Triffitt, Shipley, England

[73] Assignee: Lucas Industries, limited Birmingham, England

[21] Appl. No.: 819,835

[22] Filed: Jul. 28, 1977

[30] Foreign Application Priority Data

Jul. 31, 1976 [GB] United Kingdom ............... 32035/76

[51] Int. Cl.³ .......................................... F16H 37/06
[52] U.S. Cl. ............................. 74/665 A; 74/665 G; 74/682; 74/199
[58] Field of Search ............. 74/190, 199, 200, 665 F, 74/665 G, 665 A, 665 B, 665 R, 201, 190.5, 682, 676; 60/716, 720, 492; 192/45

[56] References Cited

U.S. PATENT DOCUMENTS

| Re. 26917 | 6/1970 | Dickenbrock | 74/200 |
|---|---|---|---|
| 2,131,158 | 9/1938 | Almen et al. | 74/200 |
| 2,651,395 | 9/1953 | Syrovy et al. | 192/48.6 |
| 3,204,486 | 9/1965 | DeLalio | 74/682 |
| 3,292,443 | 12/1966 | Perruca | 74/200 |
| 3,300,000 | 1/1967 | Stoyke | 60/492 |
| 3,494,224 | 2/1970 | Fellows et al. | 74/200 |
| 3,739,658 | 6/1973 | Scheiter | 74/200 |
| 3,760,646 | 9/1973 | Kraus | 74/200 |
| 3,802,284 | 4/1974 | Sharpe et al. | 74/200 |
| 3,826,147 | 7/1974 | Sharpe et al. | 74/200 |
| 3,826,148 | 7/1974 | Magill | 74/200 |
| 3,826,618 | 8/1974 | Sharpe et al. | 74/200 |
| 4,044,632 | 8/1977 | Wildhaber | 74/665 G |

FOREIGN PATENT DOCUMENTS

1267926  3/1972  United Kingdom ............... 60/716

*Primary Examiner*—Samuel Scott
*Assistant Examiner*—G. Anderson
*Attorney, Agent, or Firm*—Kane, Dalsimer, Kane, Sullivan and Kurucz

[57] ABSTRACT

A variable speed transmission system comprising at least two variable ratio gears each comprising two axially spaced torous discs or rotors, one serving as an input and the other as an output between which there is a set of circumferentially spaced drive rollers in frictional rolling contact with part toroidal surfaces on the discs each roller being rotatably mounted in the bearing structure which can tilt about an axis at right angles to the axis of rotation of each roller so as to vary the distances from the gear axis at which the roller engages the two discs respectively thus varying the drive ratio of the gears, the two variable ratio gears having respective inputs include two rotors connected to respective input shafts and respective output shafts the inputs and outputs of the gears being respectively coupled together to operate in parallel and there being common hydraulic fluid supply to each of the variable ratio gears for controlling ratio change means of the respective gears.

2 Claims, 2 Drawing Figures

VARIABLE SPEED TRANSMISSION SYSTEMS

BACKGROUND AND SUMMARY OF THE INVENTION

This invention relates to variable ratio frictional drive transmission systems including drive units or gears of the kind comprising basically two axially spaced torus discs or rotors, one serving as an input and the other an output, between which there is a set of circumferentially spaced drive rollers in frictional rolling contact with part toroidal surfaces on the discs, each roller being rotatably mounted in a bearing structure which can tilt about an axis at right angles to the axis of rotation of each roller so as to vary the distances from the gear axis at which the roller engages the two discs respectively, thus varying the drive ratio of the gear. The angle of tilt of the roller bearing structure as it controls the drive ratio of the gear, is called the ratio angle.

One way of changing the ratio angle is to tilt the roller bearing structure by bodily moving it tangentially with respect to the gear axis, and by allowing the rollers then to steer themselves towards a different ratio angle. This adjustment is achieved by arranging the rollers at an angle to a plane perpendicular to the gear axis so as to induce the required steering. This angle is called the caster angle. Such a drive gear will for convenience herein be described as being of the kind specified.

This invention is particularly concerned with gears in which the plane of each roller, normal to the axis of rotation of the roller and passing through the points of contact of the roller with the two opposed torus discs, contains the axis about which the roller tilts, being tangential to the torus centre circle (i.e. the locus of the centre of the circle revolved to generate the torus) as distinct from gears in which the same plane for each roller is closer to the main axis of rotation of the gear.

The apparatus may run at very high rotational speeds, perhaps up to 20,000 revolutions per minute, and thus operating conditions may be extremely arduous and power transmission requirements may be very high.

There are, moreover, certain practical limitations on the size of the transmission system. If the components are of large size the wear characteristics tend to be poor and power transmissions are therefore limited by the stength of the components.

It is the object of this invention to provide a variable speed transmission system in which power of relatively high order can be transmitted.

According to the present invention there is provided a variable speed transmission system of the kind specified comprising at least two variable ratio gears of the kind specified and having an input and an output respectively, the inputs and outputs of the gears being respectively coupled together to operate in parallel, there being a common hydraulic fluid supply to each of the variable ratio gears for controlling the ratio change means of the respective gears.

The invention will now be described by way of example, with reference to the accompanying drawings, in which:

DETAILED DESCRIPTION OF THE INVENTION

The transmission system is principally designed for use in driving aircraft accessories and in particular an alternator. The alternator is driven from an aircraft main engine but is required to be rotated at constant speed. The transmission is therefore designed for variable input speed, but constant output speed. It is, however, to be understood that transmissions incorporating the invention as herein defined can be used in transmission of this sort with other operating characteristics including constant input and variable output speed and variable input as well as output speeds.

Figure 1:
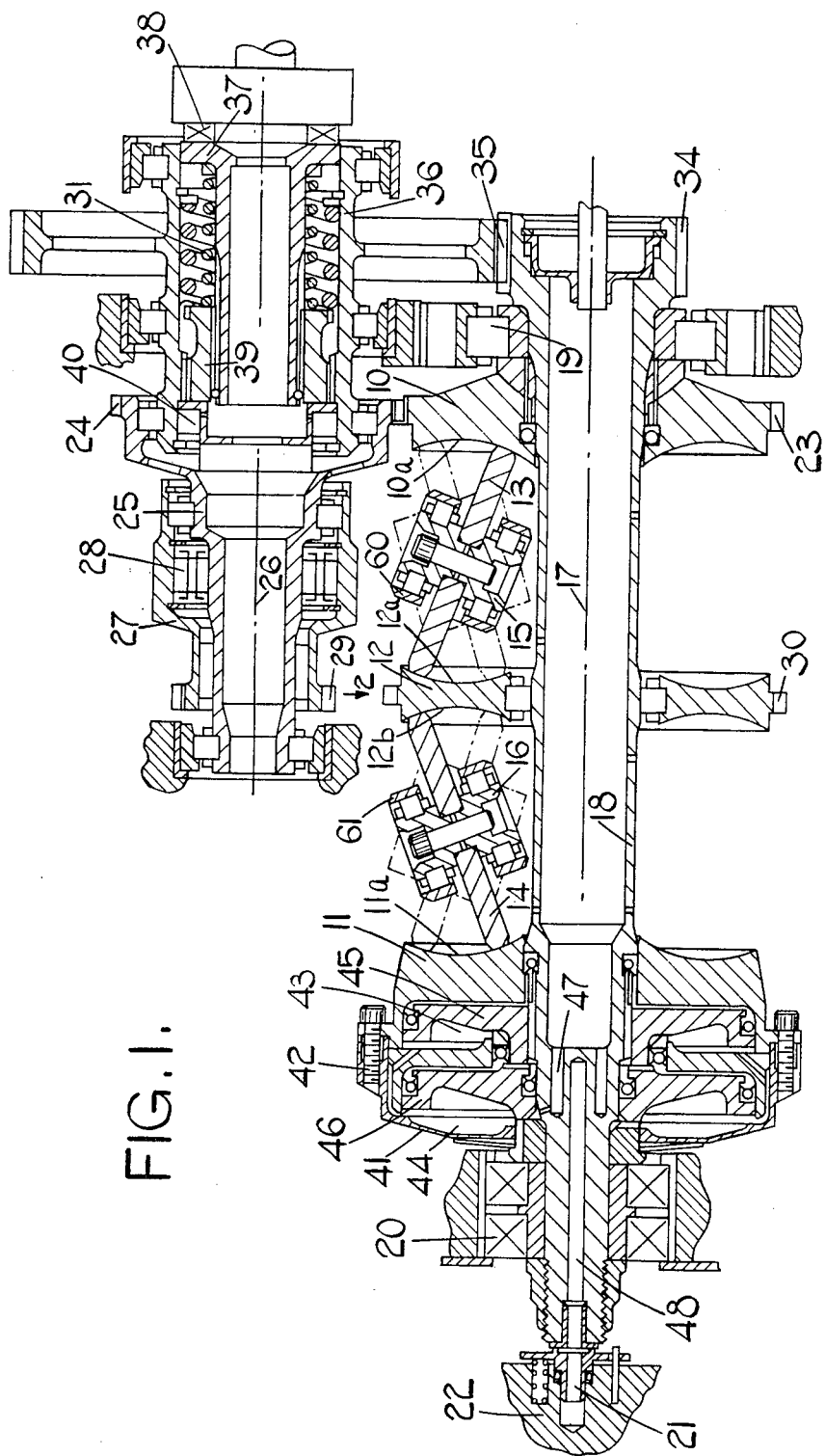
FIG. 1 is a cross-sectional view of one variable speed ratio gear employed in a transmission system according to the invention.

Referring first to FIG. 1, the general layout of the transmission is illustrated. The system includes a variable ratio drive unit having three rotors 10, 11, 12 which have respective part toroidal surfaces 10a, 11a, and 12a and 12b respectively. The rotor 12, is situated mid-way between the rotors 10 and 11, and is provided with its part toroidal surfaces 12a, 12b on opposite axially presented sides thereof. The rotor 10 has its part toroidal surface 10a presented towards the surface 12a, and similarly the surface 11a of the rotor 11 is presented towards the surface 12b of the central rotor 12. The rotors 10, 11 are input rotors and the rotor 12 is an output rotor. However, the system will operate perfectly satisfactorily with the rotors 10, 11 as output and the input is the rotor 12. Situated between the rotors 10, 12 and 11, 12 are respective sets of flat rollers 13, 14. These are rotatable in a manner which will be described and are for this purpose carried in respective bearings 15, 16. The rollers are shown in FIG. 1 in positions in which they engage the respective surfaces 10a, 12a and 11a, 12b at different distances from the axis of rotation of the rotors 10, 11, 12 or gear axis. Such axis is identified at 17. The rotors 10, 11 are carried non-rotatably upon a hollow shaft 18. This is supported on suitable fixed structure 22 by means of bearings 19, 20 situated near its opposite ends respectively.

The input rotor 10 has on its external periphery, gear teeth 23, engaging with a gear ring 24, on a hollow stepped shaft 25. This hollow stepped shaft is mounted for rotation about an axis 26, parallel with the axis 17. Connecting the hollow stepped shaft 25, with a surrounding sleeve 27, is a clutch 28. The sleeve 27, has gear teeth 29, meshing with a gear (not shown) which drives auxiliary equipment which forms no part of this invention.

The output rotor 12 has external gear teeth 30 and this represents the output of the drive unit.

Driving the shaft 18, through gear teeth 34, thereon is a gear wheel 35, which is carried on a further hollow sleeve 36. Between the sleeve 36, and an input shaft 37, with, at one end, dogs 38, is a coupling incorporating an intermediate slidable sleeve 39, and an element 40, which is arranged to melt and allow the sleeve 39 and hence the shaft 37 to move under the influence of springs 31 in the event of this part of the system reaching a temperature in excess of a predetermined value, to disconnect the input drive from the system. This forms the subject for copending British Pat. application No. 33909/76.

To load the rotors 10, 11, 12 and the rollers 13, 14 so as to maintain frictional contact between them, there is an end load device within a housing 41, secured by screws 42, to the rotor 11, at the side thereof remote from its part toroidal surface 11a. Defined within the space between the rotor 11, and the housing 41, are cavities 43, 44 for hydraulic fluid. Within the cavities are respective pistons 45, 46 mounted on the shaft 18. In the end of the shaft 18 is a rotary fluid joint 21 engaged in the fixed structure 22. Furthermore in this end of the shaft 18 are drillings 47, 48 for supply and exhaust of fluid to the cavities 43, 44. The passage 48 communicates with the joint 21 for supplying high pressure fluid fed at one side of each of the pistons 45 and 46. At the other side of the pistons 45 and 46 lower fluid pressure is fed from one of the two drillings 47 which are symmetrical for balance of the shaft.

In operation of this transmission system, with variable speed input and constant output to the drive, there is automatic compensation for input speed change and this is achieved through the alteration in the ratio angle of the rollers. The inclination of the rollers as seen in FIG. 1, regulates the ratio of the speed of the input rotors 10, 11 to the speed of the output rotor 12. As illustrated in full lines, rotation of the input rotors 10, 11 at a given speed will cause rotation of the output rotor 12, at a slower speed than said given speed. As indicated in dotted lines the opposite ratio characteristic can be achieved if the point of contact between the rollers on the input rotors 10, 11 is outside that on the surfaces 12a, 12b of the output rotor 12. If however, the rollers engage the surfaces 10a, 11a, 12a and 12b at the same radial distance on each such surface from the axis 17 of the shaft 18, the input and output rollers 10, 11, 12 will all rotate at the same speed. This represents a drive ratio of 1:1 between the input and the output of the system. To induce the rollers to change their ratio angles, they are mounted in their bearing structures at an angle to a plane perpendicular to the gear axis 17. This angle is called the caster angle. Preferably, the higher the rotational speed induced in the output rotor 12, the greater the caster angle should be. This improved stability in the system at high rotational speeds which may be of the order of 20,000 revolutions per minute.

Figure 2:
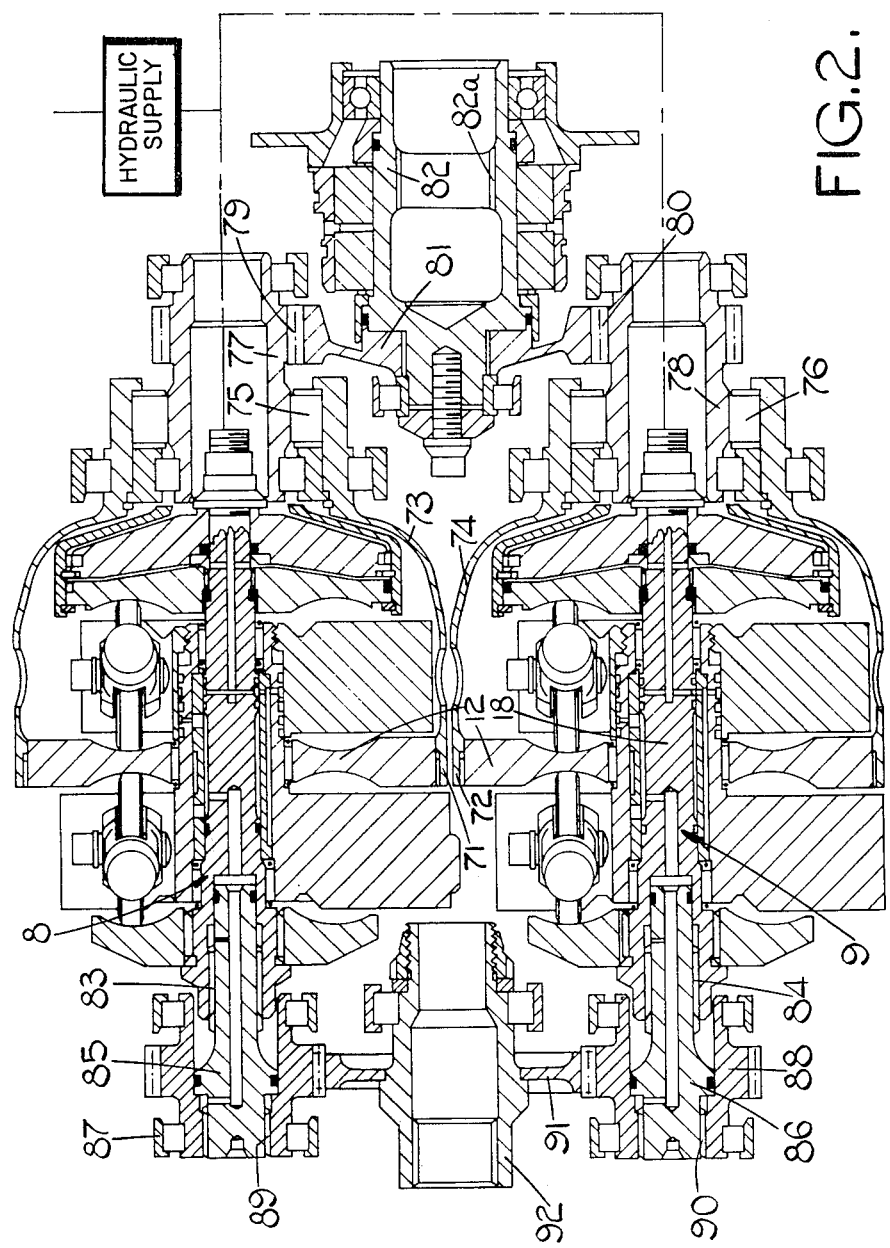
FIG. 2 is a variable speed transmission system according to the invention and having two gears of the general kind shown in FIG. 1.

The system shown in FIG. 2 has two of the gears or drive units described, although there are certain constructional differences between the FIGS. 1 and 2 units, though the same numerals are used for corresponding parts.

The components of the input are, in particular, different between the two Figures. In FIG. 2 the inputs of the two drive units, identified generally as 8 and 9, are formed by the respective rotors 12. The two drive units are side by side and their shafts 18 are parallel. On their external peripheries, the rotors 12 have splines 71, 72 engaged with splines on hollow housings 73, 74 which enshroud the respective end loading devices, as well as the rotors 11 of each of the drives. The housings 73, 74 are connected through one way clutches 75, 76 on hollow shafts 77, 78 which are co-axial with the respective shafts 18 of the drive units. The clutches 75, 76 are provided to prevent overrun between the two gears. The hollow shafts 77, 78 have further gear teeth 79, 80 meshing with a single input gear 81. This is on a system input shaft 82 with provision, in the form of an internal spline 82a in its outer end, for connection to the apparatus which drives the transmission system. By means of this input apparatus the two drive units are driven in parallel and at the same speed.

Within the ends of the shafts 18 remote from the input apparatus, they have respective splines 83, 84 engaging coaxial shafts 85, 86. These project into respective gears 87, 88 being connected by further splines 89, 90 thereto. The gears 87, 88 furthermore mesh with a single output gear 91 mounted on an output shaft 92 co-axial with the input shaft 82, but at the opposite end of the transmission system.

Within the shafts 18 are hydraulic fluid passages, similar to those shown in the construction shown in FIG. 1. These passages communicate with common sources of high and low pressure for controlling the respective end load devices and the respective ratio control means of the two drive units. The performances of the two drive units are therefore the same during all operating conditions. The common hydraulic supply is diagrammatically shown in FIG. 2.

What is claimed is:

1. A variable speed transmission system comprising at least two variable ratio gears, comprising two axially spaced torous discs or rotors, one serving as an input and the other as an output, between which there is a set of circumferentially spaced drive rollers in frictional rolling contact with part toroidal surfaces on the discs, each roller being rotatably mounted in a bearing structure, means for tilting said bearing structure, means for tilting said bearing structure about an axis at right angles to an axis of rotation of each roller, so as to vary the distances from the gear axis at which the roller engages the two discs respectively, thus varying the drive ratio of the gear, means interconnecting the input and output of the two gears respectively, whereby the gears operate in parallel, and common hydraulic fluid supply to each of the variable ratio gears for controlling the ratio change means of the respective gears.

2. A variable speed transmission system as claimed in claim 1 in which one way clutches interconnect the inputs.

* * * * *

UNITED STATES PATENT AND TRADEMARK OFFICE
CERTIFICATE OF CORRECTION

PATENT NO. : 4,252,033

DATED : February 24, 1981

INVENTOR(S) : JAMES TRIFFITT ET AL

It is certified that error appears in the above—identified patent and that said Letters Patent is hereby corrected as shown below:

Claim 1, column 4, line 40, delete "means for tilting said bearing structure,".

Signed and Sealed this

Twenty-sixth Day of May 1981

[SEAL]

Attest:

RENE D. TEGTMEYER

Attesting Officer

Acting Commissioner of Patents and Trademarks